United States Patent [19]

Thomas

[11] 4,164,077
[45] Aug. 14, 1979

[54] LEVEL INDICATING DEVICES

[75] Inventor: Robert R. Thomas, Hartford, Kans.

[73] Assignee: Hopkins Manufacturing Corporation, Emporia, Kans.

[21] Appl. No.: 922,763

[22] Filed: Jul. 7, 1978

[51] Int. Cl.² .............................................. G01C 9/32
[52] U.S. Cl. ....................................... 33/348; 33/366; 250/577
[58] Field of Search ................... 33/348, 366; 250/577; 350/112

[56] References Cited

U.S. PATENT DOCUMENTS

| | | | |
|---|---|---|---|
| 692,097 | 1/1902 | Wood | 33/348 |
| 771,803 | 10/1904 | Bishop | 33/348 |
| 937,357 | 10/1909 | Bensen | 33/348 |
| 1,309,752 | 7/1918 | Bossler | 33/379 |
| 1,563,321 | 12/1925 | Bedortha | 33/379 |
| 1,578,786 | 3/1926 | Weston | 33/348 |
| 1,654,248 | 12/1927 | Erdmann | 33/348 |
| 2,362,872 | 11/1944 | Weagle | 33/348 |
| 3,683,196 | 8/1972 | Obenhaus | 250/577 |
| 3,694,090 | 9/1972 | Ohyama | 356/148 |
| 3,727,242 | 4/1973 | Miller | 4/10 |

Primary Examiner—Charles E. Phillips
Attorney, Agent, or Firm—Kenway & Jenney

[57] ABSTRACT

Level indicating devices wherein at least a side portion of a bubble cavity is defined by a reflecting surface having at least a linear cross section lying generally in a plane aligned with or paralleling a light source and a bubble image observer (i.e. person or sensor).

12 Claims, 6 Drawing Figures

U.S. Patent  Aug. 14, 1979  4,164,077
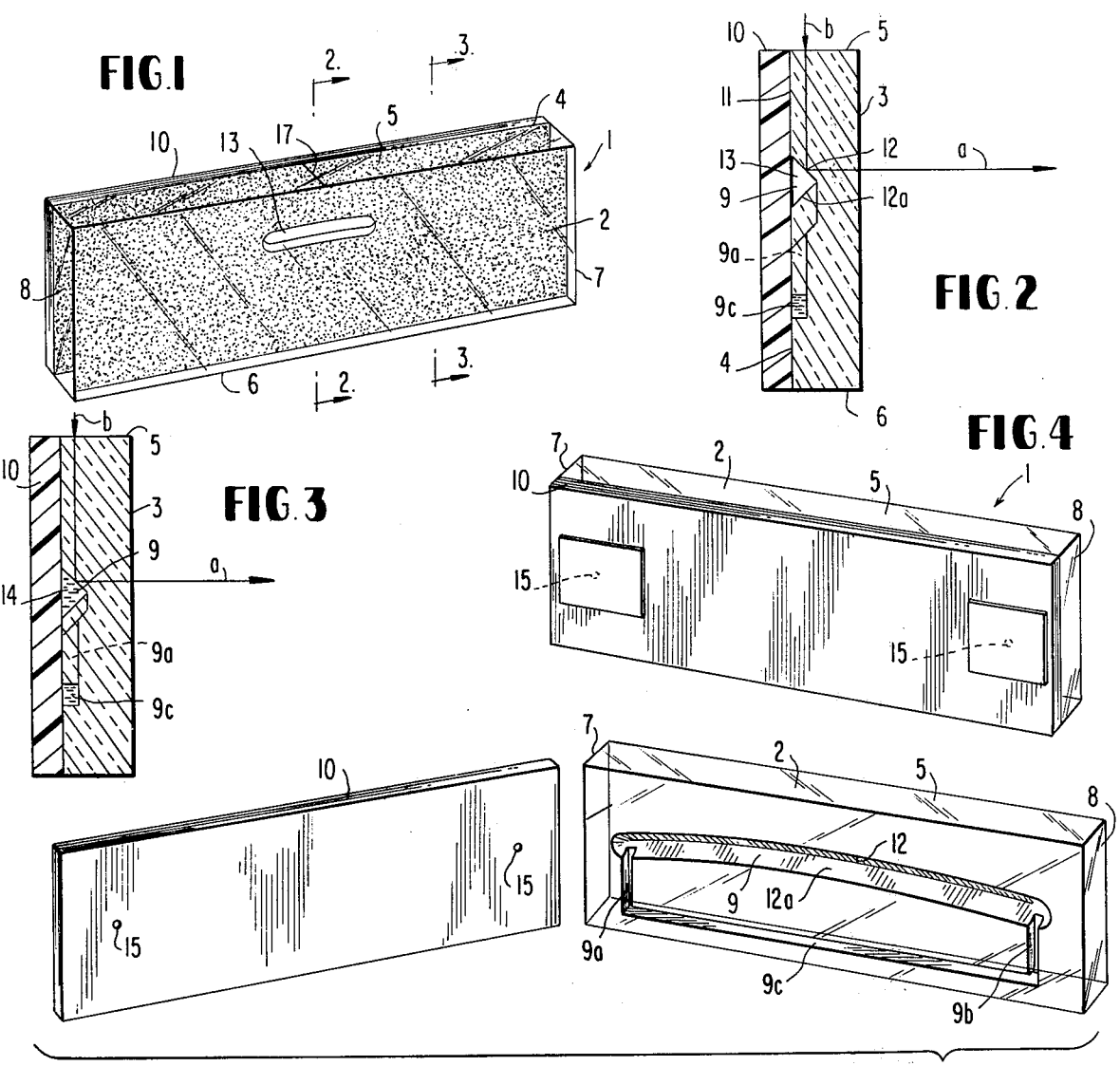
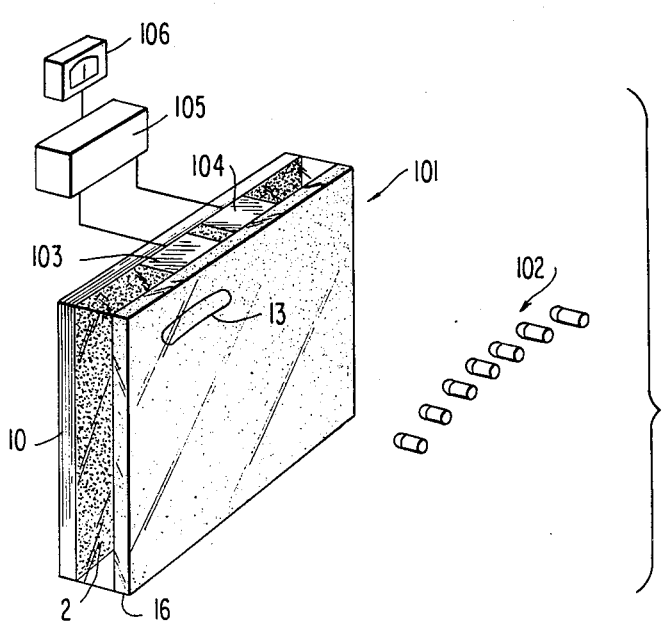

LEVEL INDICATING DEVICES

GENERAL BACKGROUND AND SUMMARY OF INVENTION

This invention pertains to uniquely improved level or inclination devices of the bubble or spirit-level type.

The invention is characterized by a singularly enhanced or intensified bubble image which facilitates manual viewing and also permits bubble type level devices, in association with light sensitive sensor means, to be employed with great accuracy, in automated electronic inclinometers.

Practitioners in this art have devoted substantial efforts to the development of level glass or spirit level structures with a view to enhancing or intensifying the bubble image and/or improving overall structure.

Representative of efforts in this respect are the following disclosures:

| U.S. Pat. (Issue Date) | Inventor | Subject Matter |
| --- | --- | --- |
| 674,107 (May 14, 1901) | J. A. Traut | Reflecting contrast surface |
| 692,097 (Jan. 28, 1902) | J. R. Wood | Color contrasting background stripe |
| 771,803 (Oct. 11, 1904) | J. Bishop | Color contrasting liquid and background |
| 937,357 (Oct. 19, 1909) | G. J. Bensen | Housing with bubble end viewing openings |
| 1,309,752 (July 15, 1919) | R. B. Bossler | Opaque ball instead of bubble |
| 1,563,321 (Sept. 6, 1921) | G. Q. Bedortha | Fluorescent liquid |
| 1,578,786 (Aug. 20, 1923) | S. Weston | Constant length bubble and flattened tube |
| 1,654,248 (Dec. 27, 1927) | F. Erdmann | Illuminated core |
| 2,362,872 (Nov. 14, 1944) | L. T. Weagle | Luminescent background |
| 2,627,121 (Feb. 3, 1952) | W. G. Moyer et al | Vial seal |
| 2,750,677 (June 19, 1956) | A. Wirth | External prism to facilitate viewing, with diffusion surface |
| 3,009,254 (Nov. 21, 1961) | H. S. Youngs | External alignment indicia |
| 3,694,090 | H. Ohyama | Colored filter with viewing prism - color refracted differently by air bubble and liquid |
| 3,766,657 (Oct. 23, 1973) | E. L. Hopkins | Reflective background |

The present invention departs totally from the spirit level teachings exemplified by prior art of the type noted above, and involves a unique adaptation and utilization of a light reflecting principal which has heretobefore been recognized, in a substantially different context, in disclosures such as Miller U.S. Pat. No. 3,737,242 (Apr. 17, 1973).

As noted in the Miller patent, a generally planar surface has markedly different light reflecting capabilities when positioned adjacent air or liquid bodies.

When a plastic body having a planar reflecting surface is positioned with the reflecting surface adjacent air, light is reflected from the surface so as to provide a relatively light appearance. When the surface is positioned adjacent a liquid, the light is diffused or refracted such that a relatively dark appearance is presented on the reflecting surface.

By departing totally from the teachings of the spirit level art as exemplified by the patents noted above, and by uniquely employing the light reflecting principals discussed above, in association with a reflecting surface defining a side portion of a bubble cavity and having at least one linear cross section (i.e., a flat or curved plane reflecting surface), the present invention, in its different aspects, produces a visually intensifed bubble image. For all practical purposes, this intensified image has the appearance of a shining, suspended globule.

With this basic objective being kept in mind, the invention will now be summarized, in relation to each of its individually significant aspects.

A first independently significant aspect of the invention is believed to reside in an improvement in a level (i.e. inclination) indicating device of the type including:
  body means defining
    fluid passage means; and
  level bubble means contained within this passage means, with the level bubble means including
    first liquid means, and
    second fluid means defining bubble means within said first liquid means.

The improvement in this first aspect of the invention reside in:
  at least one surface means having a generally linear cross section and defining a side portion of the above noted passage means;
  this surface means being operable to receive light and reflect therefrom, with
    light reflected from the surface means having a generally linear cross section, adjacent said bubble means, defining a visually intensified bubble image.

In a second independently significant aspect of the invention, the improvement in the level indicating device of the type aforenoted resides in the combination of:
  surface means defining at least a first side portion of the aforesaid passage means, particularly when this passage means is arcuate and disposed in a generally downwardly concave configuration; and
  wall means disposed on a second side portion of the passage means, generally opposite to the first side portion, with the level bubble means being disposed, at least in part, generally between the first and second side portions of the passage means;
  the surface means being operable to receive light and reflect light toward an observer with
    light reflected from said surface means, adjacent the bubble means, defining a visually intensified bubble image, and
  the second wall means being visually contrasting in relation to the bubble image.

A third independently significant aspect of the invention pertains to an overall level indicating device structure comprising:
  light transmitting body means having generally parallel sides and defining, on one side thereof,
    generally arcuate recess means operable to be oriented so as to be disposed in a generally downwardly concave configuration;
  generally segmental, frusto-conical surface means formed within the body means and defining at least a first side portion of the recess means, when the recess means is disposed in the generally downwardly concave configuration;

backing means defining a second side portion of the recess means, generally opposite to the first side portion; and level bubble means contained within the recess means, this recess means including
  first liquid means, and
  second gas means defining gas bubble means within the liquid means,
  the level bubble means being disposed, at least in part, generally between the first and second side portions of the recess means, the backing means being relatively dark and opaque relative to the body means;

the generally segmental, frusto-conical surface means being operable to receive light and reflect light toward an observer (i.e. a person or light sensing means) with
  light reflected from the generally segmental, frusto-conical surface means, adjacent the gas bubble means, defining a visually intensified bubble image; and said backing means being operable to diminish the visibility of the recess means and first liquid means.

In the context of each of the independently significant invention aspects noted above, additional features of relevance reside in the utilization of light diffusing means so as to tend to diffuse light impinging upon the bubble area of the device and/or in the use of indicia means which provide a desired position reflection in conjunction with the reflected bubble image.

The improved spirit level or level bubble concept of the invention is believed to afford particular utility in the context of an automated inclination measuring device wherein the light (possibly from an array of LED units) is directed against a reflecting side surface of the bubble recess or passage, with an enhanced bubble image being reflected from this surface toward a pair (or more) of light sensitive sensor means. The relative degree of light sensed by the sensor is reflective, with an unusual degree of accuracy, of the positioning of the bubble relative to the light sensing means.

Having summarized certain independently significant aspects of the invention, it is now appropriate to consider presently preferred embodiments of the invention which are depicted by way of example, but not by way of limitation, in the appended drawings.

As shown in the appended drawings, which depict presently preferred embodiments of the invention:

FIG. 1 provides a perspective, front view of a spirit level or level indicating device of the present invention;

FIG. 2 provides an enlarged, transverse, sectional view of the FIG. 1 device, as viewed along section line 2—2 of FIG. 1 intersecting a gas bubble and depicting the manner in which external light impinging upon a frusto-conical surface of the bubble recess or passage adjacent the gas bubble recess of passage adjacent the gas bubble is reflected toward an observer;

FIG. 3 provides an enlarged, transverse, sectional view of FIG. 1 structure, as viewed along sectional line 3—3 intersecting liquid in the bubble recess or passage, and illustrating the manner in which external light impinging upon the frusto-conical surface of the recess or passage adjacent liquid is diffused or refracted so as not to be reflected toward an observer;

FIG. 4 proves a rear perspective view of the FIG. 1 assembly, illustrating the manner in which one or more orifices may be employed in a backing plate for the purpose of filling the bubble recess or passage and/or forming the gas bubble by appropriate and conventional vacuum extraction techniques;

FIG. 5 provides a perspective view of the separated backing and main body components of the FIG. 1 assembly; and FIG. 6 schematically illustrates the manner in which the FIG. 1 mechanism may be employed in association with a diffuser plate and an array of LED illuminating means, disposed on one side thereof, to provide a reflected bubble image sensed on the upper edge of the device by light sensing means, with such sensing being employed to indicate the relative positioning of the bubble within the recess, i.e., the inclination of the device.

Having described the contents of the appended drawings, consideration will now be given to a more detailed discussion of the overall invention.

DETAILED DESCRIPTION OF PRESENTLY PREFERRED EMBODIMENTS

In describing presently preferred embodiments of the invention, reference will be made to the accompanying drawings, first with respect to broad aspects of the invention, and then with respect to more specific applications and features.

At the outset, a reflecting surface, having at least a linear cross section in one direction (i.e. a curved or flat plane) will be discussed with respect to the manner in which such a surface may be uniquely employed in a bubble cavity of a level so as to provide a particularly enhanced bubble presentation effect.

In addition, the manner in which the visually enhanced bubble image may be further enhanced by the utilization of appropriate visually contrasting backing or rear wall means for the bubble cavity will be discussed, along with the manner in which light diffusing means may be appropriately employed to insure generally even or diffused illumination of the overall bubble cavity.

Reference will also be made to the manner in which reflected indicia may be superimposed on the bubble image so as to further enhance the visual effect of the level sensor device of the present invention.

Thereafter, a particularly sensitive and effective electronic inclinometer utilizing the level structure of the present invention will be discussed.

GENERAL STRUCTURE—BUBBLE CAVITY WITH SELECTIVE LIGHT REFLECTING SURFACE MEANS AND/OR CAVITY AND LIQUID IMAGE SUPPRESSING BACKING.

As shown in FIGS. 1-5, a level device 1 of the present invention may be fabricated, in part, from a transparent plastic, glass, or ceramic body 2 having a generally rectangular configuration and block or sheet-like appearance.

Body 2 may have front and rear sides 3 and 4 as shown in FIGS. 1 and 2 which are mutually parallel, top and bottom parallel surface 5 and 6, and parallel end surfaces 7 and 8.

The rear of body 2 may be provided with an arcuate bubble cavity 9 as shown generally in FIG. 5.

Cavity 9 is preferably curved about an axis located centrally of body 2 and substantially beneath lower edge 6.

As illustrated, cavity 9 may be triangular in cross section and be formed by a conical routing device, with the legs of each cross section being inclined 45° to surface 4.

If desired, and so as to facilitate free movement of the bubble within the bubble passage, the ends 9a and 9b of bubble passage 9 may be connected by a lower return passage 9c. The purpose of return passage 9c is to facilitate the transfer of bubble cavity liquid from one end of the passage 9 to the other as the bubble moves across or through the passage.

A backing plate 10 may be affixed to the rear side wall 4 of the body 2 so as to close the cavity 9. Wall 10, which is visually contrasting relative to the body 2, in relation to the level bubble contained within the passage 9, and is preferably dark and opaque, provides a bubble cavity side portion 11, which is generally opposite to side portion 12 of cavity 9, as defined by this upper wall portion of the cavity 9.

Upper wall portion 12 is preferably generally frusto-conical in nature and thus includes at least one linear cross section. In this case, any cross sectional plane passing perpendicular to surfaces 3 and 4 and through the axis of curvature of arcuate passage 9 will be straight or linear. In general, it may be said that the surface 12 should be sufficiently flat or linear in part as to be operable to reflect light impinging thereon, and redirect this light at an angle, to the location of an observer (i.e. person) or sensor. This means that a cross section of the surface partially facing each of a light source and observer should have a linear cross section (i.e. the linear cross section will lie in a plane aligned with or parallel to a light source and an observing means.

As will be apparent by reference to FIGS. 1 and 2, cavity side portions 12 and 11 lie on opposite sides of a bubble 13 which is contained within the passage 9. Bubble 13 may be defined by a gas cavity within a body 14 of liquid, in a manner now well recognized. Liquid 14 preferably is of a material which will not adversely attack the surface of material of body 2 and may comprise a material such as a kerosene or other noncorrosive hydrocarbon where body 2 is fabricated, for example, from acrylic plastic.

One or more openings 15 in backing 10 may be employed to inject liquid into the cavity 9 and/or may be employed to withdraw liquid from the filled cavity for the purpose of forming a bubble 13 of the desired size. In any event, these openings will be sealed when the bubble 13 has been properly formed.

With the backing 10 assembled on to the body 2 and sealed thereto, so as to provide the gas bubble 13 (which preferably occupies the upper portion of cavity 9 as shown in FIG. 2) floating with the cavity 9, with liquid 14 being on either end of and possibly beneath the gas bubble 13, and with the body 2 being light transmitting and backing 10 being relatively dark and opaque or otherwise visually contrasting in relation to the bubble 13, a unique visually enhanced presentation of bubble 13 occurs.

With this arrangement, an observer looking along line "a" toward reflecting surface 12 will observe a crystal-like apparently illuminated, bubble image 13, with there being virtually no appearance of the remainder of the passage 9 or the liquid 13 or at least a diminished image thereof. In other words, the observer will appear to see a shiny bubble "floating" image, instead of the usual bubble level presentation where an observer sees both the gas and liquid clearly and experiences some difficulty in distinguishing between the gas bubble and the liquid. Depending upon the relative heights of the bubble and the reflecting wall means, an upper portion only or more of the bubble may present the above noted enhanced visibility.

The enhanced bubble presentation results in the fact that, in the area of the gas bubble, as shown in FIG. 2, light directed along line "b" toward surface 12 will be reflected at a 90° angle, along line "a", toward the observer whereas, as shown in FIG. 3, light reflected against surface 12 in the vicinity of the fluid 14 will not be reflected back towards the observer facing side 3 of the level device. To some extent, this same phenomena may occur with respect to lower, frusto-conical surface 12a of passage 9, where the gas bubble 13 is large enough to engage surface 12a, in respect to bottom light.

Because of the opaque character of the backing, back illumination of the passage 9 is eliminated, so as to diminish the visual appearance of the passage, with the dark or visually constrasting color of the backing 10 serving to provide a dark field effect surrounding and constrasting with the illuminated image of the bubble 13.

Of course, the observations that have been made here are in part applicable with respect to an observer observing the top edge 5 of the body 2, (or even the bottom edge 6) insofar as the visually enhanced character of the bubble image is concerned. However, the observer looking down on top edge 5 (or up toward lower edge 4) while he will observe an enhanced bubble image, will not observe the dark field effect which will be apparent by an observer facing the front side 3.

In summary the above noted, preferred embodiment of invention may be summarized as follows.

Level indicating device 1 includes a light transmitting body means 2 having generally parallel sides 3 and 4 and defines, on one side thereof, generally arcuate recess means 9 operable to be oriented so as to be disposed in a generally downwardly concave configuration. A generally segmental, frusto-conical surface means 12 is formed within body means 2 and defines at least a first side portion of the recess means 9, when this recess means 9 is disposed in a generally downwardly concave configuration. A backing means 10 defines a second side portion of the recess means 9, generally opposite to the first side portion. A level bubble means, contained within the recess means 9, includes first liquid means 14 and second gas means defining gas bubble means 13 within the liquid means 14. The level bubble means is disposed, at least in part, generally between the first and second side portions of said recess means 9.

The backing means 9 is preferably relatively dark and opaque relative to said body means, where manual observation of the side 3 of the device 1 is contemplated.

The generally segmental, frusto-conical surface means 12 is operable to receive light and reflect light toward an observer (i.e. person or light sensor), with light reflected from the generally segmental, frusto-conical surface means 12, adjacent the gas bubble means 13, defining a visually intensified bubble image.

In addition, where employed, the backing means 10 is operable to diminish the visibility of the recess means and first liquid means 14 where observation of the face 13 is involved.

UTILIZATION OF LIGHT DIFFUSION

In order to provide a generally uniform illumination of the cavity 9 and thus the gas bubble 13, a light diffusing surface means may be incorporated between a light source and the passage, cavity, or recess 9. Thus for example as shown in FIG. 2, surfaces 5, 3, and/or 12 may be made light diffusive (i.e., be sand blasted, frosted etc.) so as to diffuse the manner in which light impinges upon the reflecting wall 12. The surface or surfaces diffused should be located between the light source and the bubble 13.

This will tend to provide a more uniform cavity illumination and thus a more uniform illumination of the overall bubble 13.

Alternatively, as will be subsequently described with respect to FIG. 6, a sand blasted or frosted or otherwise formed light diffusing and transmitting plate 16 may be incorporated on the front face of body 2 where it is desired to provide generally uniform illumination of the cavity 9 from the side 3, where illumination is being provided by a series of discreet light sources or from a single light source.

ELECTRONIC INCLINOMETER UTILIZING IMPROVED LEVEL INDICATING DEVICE OF THE PRESENT INVENTION

FIG. 6 schematically illustrates the manner in which the level indicating device 1 of the present invention may be uniquely employed in an automated, electronic type inclinometer.

The automated level indicating device 101 shown in FIG. 6 includes the body means 2 defining the generally arcuate passage means 9, oriented so as to be disposed in a generally downwardly concave configuration. Level bubble means, contained within the passage means 9, includes first liquid means 14 and second gas means defining gas bubble means 13 within the first liquid means 14.

An array 102 of LED units, arrange in a plane parallel to and spaced from face 3 of body 2 and lying in an arc paralleling and opposite cavity 9, defines illuminating means operable to direct light toward the passage means.

A pair of light sensing units 103 and 104 may be mounted on top edge 5 in spaced relation on opposite sides of the apex of cavity 9 to define light sensing means operable to sense light generated by illuminating means 102 and impinging upon the passage means 9.

Electrical signals generated by light sensing units 103 and 104 (voltage proportional to extent of illumination bubble beneath sensor) may be processed by conventional bridge or other comparitor circuit means so as to cause a dial or other indicator 106 to indicate the position of bubble 13 relative to sensors 103 and 104 and thus the inclination of unit 2.

Indicating means 106 is thus operable in response to the sensing of light by the light sensing means 103 and 104 to indicate at least a function of the position of the gas bubble means relative to the light sensing means and therefore the inclination of body 2 and any apparatus or means to which body 2 is attached.

A light diffusing, light transmitting plate or sheet 16 is desirably interposed between the illuminating means 102 and the gas bubble means 13, with this light diffusing means 16 thus being operable to tend to provide generally diffused even illumination of the gas bubble means 13. Plate 16 may be affixed to face 3 of body 2, as shown in FIG. 6.

The generally segmental, frusto-conical surface means 12 is operable to receive light generated by said illuminating means 102 and reflect light upwardly toward the light sensing means 103 and 104, with light reflected from the surface means 12, adjacent the gas bubble means 13, defining a visually intensified bubble image as to permit unit 101 to operate with a high degree of accuracy.

In one presently preferred embodiment, units 103 and 104 may each comprise self generating, silicon type solar cells of the plate type, such as Model SS-50 units available from Solar Systems, Highway 18 East, Dodgeville, Wis. 53533. These units may each be about one inch in length, about 2/10 inches in width and spaced apart about 1/10 inch. Units 103 and 104 may be mounted, as shown, parallel to top surface 5 (flush or inset) or may be mounted so as to be parallel to surfaces which are tangential to the arc or curvature of cavity 9.

In the preferred arrangement shown, bubble 13 may be about an inch in length, with its width being about ⅛ inch and the apex of cavity 9 being about ⅛ inch from the plane underlying sensing units 103 and 104.

This arrangement is such that each of units 103 and 104 will always be operable to sense light reflected from the ends of bubble 13, throughout the operational tilting range of body 2. As a consequence, the unit will automatically compensate for temperature induced changes in the length of bubble 13 and the curved bubble end configurations (i.e. signals correlating with changes in bubble length and the end configuration of the bubble will cancel each other out in comparative circuitry evaluation).

While any of several known comparative circuitry techniques may be employed for the purpose of enabling unit 106 to indicate a level or inclination condition, reference may be made to the following patents for examples of circuitry of the general type under consideration:

| U.S. Pat. | Patentee | Issue Date |
| --- | --- | --- |
| 2,252,727 | Pepper | Aug. 19, 1941 |
| 3,096,591 | Higgins, Jr. et al | July 9, 1963 |
| 3,172,212 | Pappas | March 9, 1965 |
| 3,324,654 | Wright et al | June 13, 1967 |
| 3,371,424 | Sweet | March 5, 1968 |
| 3,822,944 | Hopkins et al | July 9, 1974 |
| 3,863,067 | Gooley | Jan. 28, 1975 |

With respect to the LED units in array 102, it is presently contemplated that Hewlett-Packard, red LED 5082-4658 units would be acceptable.

At the present time, it is contemplated that unit 101 function as an inclinometer, with the ratio of the voltage generated individually by each of units 103 and 104 to the sum of these voltages being reflective of the positioning of bubble 13 relative to units 103 and 104, and hence the inclination or "level" condition of unit 2.

REFLECTED ALIGNMENT INDICIA

The level indicating device 2, as shown in FIG. 1, may also include position indicating means 17 interposed, on the body means 2, generally between a source of light and the generally segmental, frusto-conical surface means 12. With this arrangement, an observer can observe a reflected image of the indicia means on the generally segmental, frusto-conical surface means 3, while the observer is simultaneously observing the visually intensified bubble image.

Thus, as shown in FIG. 1, with a solid center line or colored, transparent center strip comprising indicia 17, formed on top edge 5, above the apex of cavity 9, an observer facing side 3 of body 2 will observe the intensified bubble image superimposed on the reflected image of indicia 17.

Having now described various aspects of certain presently preferred embodiments of the invention, it is appropriate to review significant advantages, unobviousness, and scope of the invention.

MAJOR ADVANTAGES, UNOBVIOUSNESS AND SCOPE OF THE INVENTION

The unique utilization of a reflected image, resulting from the use of a bubble cavity side wall having at least one linear cross section, provides a singularly intensified and enhanced bubble image presentation.

By utilizing the reflecting surface concept in a level bubble, in combination with the visually contrasting backing, a further enhanced bubble presentation effect is achieved, where the intensified bubble image is displayed in a field which subdues or apparently eliminates an image of the liquid and a portion of the bubble cavity occupied by liquid so as to appear to present the bubble "floating in space".

Where the bubble device of the present invention is employed in such a manner that it is desired to have a generally uniform bubble image, throughout its length, the incorporation of a light diffusing means between the light source and the reflecting surface is particularly effective. This tends to eliminate undesired directional sensitivity of the unit, with respect to a light source.

Fabricating the level from the plate structures, as heretofore described, with the cavity being formed by the simple expedient of routing or molding, yields a spirit level structure which may be fabricated with unusual simplicity and effectiveness.

As will be apparent, the state of the prior art, as exemplified by prior art patents noted at the outset of this disclosure, totally negates the utilization of a reflecting surface type bubble cavity or the utilization of such a light surface in combination with a visually contrasting backing, thereby evidencing the unobviousness of the invention.

With respect to the scope of the invention, it will be apparent that the invention is not limited to specific body, or backing, or cavity configuration and/or materials as illustrated and described and that the invention is not limited with respect to the types of fluids employed in the bubble cavity, the form of the bubble cavity, the slope of surface 12, etc.

At this point, it is believed that an effective surface 12 may be frusto-conical in shape, as described, or may be even essentially flat and planar in shape, and be defined, for example, by a flat wall intersecting an arcuate cavity of circular cross sections. However, the frusto-conical reflecting wall is presently preferred, since it is believed to minimize undesired light scattering.

In any event, those skilled in the art and familiar with this disclosure may envision additions, deletions, substitutions, equivalents and other modifications which would fall within the scope of the invention as set forth in the appended claims.

What is claimed is:
1. In a level indicating device including
    body means surrounding a generally arcuate fluid passage means; and
    level bubble means contained within said passage means, with said level bubble means including
        first liquid means, and
        second fluid means defining bubble means within said first liquid means;
    the improvement comprising:
    at least one surface means having a generally linear cross section and defining a side portion of said passage means;
    said surface means being operable to receive light and reflect light therefrom, with
        light reflected from said surface means having a generally linear cross section, adjacent said bubble means, defining a visually intensified bubble image.
2. In a level indicating device including
    body means defining
        generally arcuate passage means operable to be oriented so as to be disposed in a generally downwardly concave configuration; and
    level bubble means contained within said passage means, with said level bubble means including
        first liquid means, and
        second gas means defining gas bubble means within said first liquid means;
    the improvement comprising:
    one side portion of said passage means being defined by at least one segment of a conical surface means when said passage means is disposed in said generally downwardly concave configuration;
    said segment of a conical surface means being operable to receive light and reflect light toward an observer, with
        light reflected from said segment of a conical surface means, adjacent said gas bubble means, defining a visually intensified bubble image.
3. A level indicating device as described in claim 2 further including
    backing means disposed on another side portion of said passage means, generally opposite to said one side portion with
        said level bubble means being disposed generally between said one and other side portions of said passage means;
    said backing means being relatively dark and opaque relative to said body means; and
    said backing means being operable to diminish the visibility of said passage means and first liquid means.
4. A level indicating device as described in claim 2 further including:
    position indicating indicia means interposed, on said body means, generally between the source of said light and said segment of a cone surface means with
        said observer being operable to observe a reflected image of said indicia means on said segment of a cone surface means while said observer is simultaneously observing said visually intensified bubble image.
5. In a level indicating device including
    body means defining
        generally arcuate passage means operable to be oriented so as to be disposed in a generally downwardly concave configuration;
    level bubble means contained within said passage means, with said level bubble means including
        first liquid means, and
        second gas means defining gas bubble means within said first liquid means; and
    light diffusing means interposed between light directed towards said gas bubble means and said gas bubble means, with said light diffusing means being operable to tend to provide generally diffused illumination of said gas bubble means;

the improvement comprising:

one side portion of said passage means being defined by at least one segment of a conical surface means when said passage means is disposed generally downwardly concave configuration;

said generally segment of a conical surface means being operable to receive light and reflect light toward an observer, with light reflected from said segment of a conical surface means, adjacent said gas bubble means, defining a visually intensified bubble image;

backing means disposed on another side portion of said passage means, generally opposite to said first side portion with said level bubble means being disposed generally between said first and second side portions of said passage means;

said backing means being visually contrasting relative to said bodya means; and said backing means being operable to diminish the visibility of said passage means and first liquid means.

6. In a level indicating device including
body means defining
generally arcuate passage means operable to be oriented so as to be disposed in a generally downwardly concave configuration;
level bubble means contained within said passage means, with said level bubble means including first liquid means, and
second gas means defining gas bubble means within said first liquid means; and
light diffusing means interposed between light directed towards said gas bubble means and said gas bubble means, with said light diffusing means being operable to tend to provide generally diffused illumination of said gas bubble means;

the improvement comprising:

at least one, one side portion of said passage means being defined by at least one segment of a conical surface means when said passage means is disposed generally downwardly concave configuration;

said segment of a conical surface means being operable to receive light and reflect light toward an observer, with light reflected from said segment of a conical surface means, adjacent said gas bubble means, defining a visually intensified bubble image.

7. In a level indicating device including
body means defining
generally arcuate passage means operable to be oriented so as to be disposed in a generally downwardly concave configuration;
level bubble means contained within said passage means, with said level bubble means including first liquid means, and
second gas means defining gas bubble means within said first liquid means;
illuminating means operable to direct light toward said passage means;
light sensing means operable to sense light generated by said illuminating means and impinging upon said passage means; and
indicating means operable in response to the sensing of light by said light sensing means to indicate at least a function of the position of said gas bubble means relative to said light sensing means;

the improvement comprising:

at least one surface means having a generally linear cross section and defining a side portion of said passage means, when said passage means is disposed in said generally downwardly concave configuration;

said surface means being operable to receive said light generated by said illuminating means and reflect light toward said light sensing means, with light reflected from said surface means having a generally linear cross section, adjacent said gas bubble means, defining a visually intensified bubble image.

8. In a level indicating device including
body means defining
generally arcuate passage means operable to be oriented so as to be disposed in a generally downwardly concave configuration;
level bubble means contained within said passage means, with said level bubble means including first liquid means, and
second gas means defining gas bubble means within said first liquid means;
illuminating means operable to direct light toward said passage means;
light sensing means operable to sense light generated by said illuminating means and impinging upon said passage means;
indicating means operable in response to the sensing of light by said light sensing means to indicate at least a function of the position of said gas bubble means relative to said light sensing means; and
light diffusing means interposed between said illuminating means and said gas bubble means, with said light diffusing means being operable to tend to provide generally diffused illumination of said gas bubble means;

the improvement comprising:

one side portion of said passage means being defined by at least one segment of a conical surface means when said passage means is disposed generally downwardly concave configuration;

said segment of a cone surface means being operable to receive said light generated by said illuminating means and reflect light toward said light sensing means, with light reflected from said segment of a cone surface means, adjacent said gas bubble means, defining a visually intensified bubble image.

9. A level indicating device as described in claim 8 further including backing means disposed on another side portion of said passage means, generally opposite to said one side portion with said level bubble means being disposed generally between said one and other side portion of said passage means;

said backing means being relatively dark and opaque relative to said body means; and said backing means being operable to diminish the visibility of said passage means and first liquid means.

10. In a level indicating device including
body means defining
fluid passage means; and level bubble means contained within said passage means, said level bubble means including
  first liquid means, and
  second fluid means defining bubble means within said first liquid means;
the improvement comprising:
  surface means defining at least a first side portion of said passage means;
  wall means disposed on a second side portion of said passage means, generally opposite to said first side portion, with said level bubble means being disposed, at least in part, generally between said first and second side portions of said passage means;
  said surface means being operable to receive light and reflect light toward an observer with
    light reflected from said surface means, adjacent said bubble means, defining a visually intensified bubble image; and
  said second wall means being visually contrasting in relation to said bubble image.

11. A level indicating device comprising
light transmitting body means having generally parallel sides and defining, on one side thereof,
  generally arcuate recess means operable to be oriented so as to be disposed in a generally downwardly concave configuration;
  segment of conical surface means formed within said body means and defining at least a first side portion of said recess means, when said recess means is disposed in said generally downwardly concave configuration;
  backing means defining a second side portion of said recess means generally opposite to said first side portion; and
  level bubble means contained within said recess means, said level bubble means including
    first liquid means, and
    second gas means defining gas bubble means within said liquid means;
  said level bubble means being disposed, at least in part, generally between said first and second side portions of said recess means,
  said backing means being relatively dark and opaque relative to said body means;
  said segment of a conical surface means being operable to receive light and reflect light toward an observer with
    light reflected from said segment of a conical surface means, adjacent said gas bubble means, defining a visually intensified bubble image; and
  said backing means being operable to diminish the visibility of said recess means and first liquid means.

12. A level indicating device as described in claim 11 wherein:
  said recess means includes a generally V-shaped cross section, with one leg of said generally V-shaped cross section intersecting said segment of a conical surface means.

* * * * *